United States Patent [19]
Hsu et al.

[11] Patent Number: 5,733,215
[45] Date of Patent: Mar. 31, 1998

[54] MULTI-SPEED SPROCKET ASSEMBLY OF A BICYCLE

[75] Inventors: Pai-Hsiang Hsu, Tainan; Jung-Ping Chiang, Taipei Hsien, both of Taiwan

[73] Assignee: Industrial Technology Research Institute, Hsinchu, Taiwan

[21] Appl. No.: 881,898

[22] Filed: Jun. 23, 1997

[51] Int. Cl.$^6$ .................................................. F16H 55/30
[52] U.S. Cl. ............................................ 474/160; 474/164
[58] Field of Search .................................. 474/151–153, 474/155–158, 160–162, 164

[56] References Cited

U.S. PATENT DOCUMENTS

| | | | |
|---|---|---|---|
| 5,073,151 | 12/1991 | Nagano | 474/160 |
| 5,437,582 | 8/1995 | Romano | 474/156 |
| 5,545,096 | 8/1996 | Su | 474/160 |
| 5,569,107 | 10/1996 | Mu | 474/160 |

*Primary Examiner*—Thomas R. Hannon
*Attorney, Agent, or Firm*—W. Wayne Liauh

[57] ABSTRACT

A multi-speed sprocket assembly of a bicycle includes at least a small sprocket and a large sprocket which enable the chain to engage with different sprockets to attain the chain shifting effect by the guidance of the rear derailleur device. The improvement of the multi-speed sprocket assembly includes three feature teeth being furnished at both the large sprocket and the small sprocket wherein a side recess is formed on each of the feature teeth at the surface of a sprocket facing another sprocket, in addition, at the first and second feature teeth of the small sprocket, there is a circular top end recess extended from the top of the teeth at the surface subjected to forces and penetrated through the circular top end recess of the whole teeth. By means of the action of the three feature teeth and their recesses of the large and small sprockets, it can guide the direction of the sidetracking of the chain to carry out the chain shifting action and avoid the occurrence of interference phenomena, thereby, enable the chain to smoothly and steadily complete the chain shifting action without lifting up the chain.

11 Claims, 8 Drawing Sheets

5,733,215

MULTI-SPEED SPROCKET ASSEMBLY OF A BICYCLE

FIELD OF INVENTION

The present invention referrs to a multi-speed sprocket assembly of a bicycle, especially the one that comprises at least a small sprocket and a large sprocket. By means of the guidance of the rear derailleur device, it enables the chain to engage with different sprockets to carry out the chain shifting action.

BACKGROUND OF THE INVENTION

The multi-speed sprocket assembly of a bicycle of the prior art as described in U.S. Pat. No. 5,073,151, when the teeth number difference of the two adjacent sprockets is relatively small, its design in the light of the chain shifting of the chain is mainly to avoid the interference due to the sidetracking of the chain. Because the diameter difference of the two adjacent sprockets is rather close, the shifting efficeincy of the chain is relatively low. Therefore, it makes use of a supporting portion at a tooth of a large sprocket to support a connecting portion of the chain plate to enable the portion of the chain, which is following the connecting portion, to be lifted up in order to facilitate the chain to engage with the large sprocket. In addition, at the small sprocket, there is a tooth having a large cut off area to avoid being interferred when the chain is subjected to the guidance of the rear derailleur device to perform sidetracking. As a matter of fact, during the chain shifting, the chain is subject to the traction of the guided wheel in the guided chain of the rear derailleur device to perform sidetracking, and the chain is engaged with the tooth of the sprocket intended to mesh by entering from the top of the tooth toward the bottom of the tooth, therefore, even though the diameters of the two adjacent sprockets are very close, it will not interfere with the side-tracking of the chain. Hence, the prior art technique in the design of the motion path by lifting up the chain during the chain shifting is not practical, also, the application of lifting up the chain by the use of the supporting portion at the large sprocket will cause the unsteadiness of the motion of the whole chain, affect the chain shifting effect, and even result in the derailment of the chain, especially, the chain shifting effect will become worse when the distance of the tangent line between the guided wheel at the guided chain of the rear derailleur device and the sprocket intended to mesh becomes too large. In additon, the large area cut off at the tooth of the small sprocket in the light of avoiding the interference of the sidetracking of the chain of the prior art will also affect the strength of the tooth which will lower the safety consideration accordingly. Therefore, the hypothesis and application of the prior art on the chain shifting is not correct and needed to be improved.

SUMMARY OF THE INVENTION

In order to resolve the fact that the motion path of the chain of the prior art during the chain shifting is not quite in accordance with the practical application, the primary objective of the present invention is to provide a multi-speed sprocket assembly of a bicycle which comprises at least a small sprocket and a large sprocket where three feature teeth are set up on each of the sprockets to "guide" the direction of the motion of the chain by means of the profile of the feature teeth to enable the motion path of the chain during the chain shifting to be in accordance with practical application, also, to accomplish chain shifting smoothly and steadily without lifting up the chain.

The next objective of the present invention is to provide a multi-speed sprocket assembly of a bicycle which comprises at least a small sprocket and a large sprocket. During the chain shifting, the chain is hauled by the rear derailleur device to shift from the sprocket origianlly meshed toward another sprocket, the last chain link which escapes from the sprocket originally meshed is called the escaping chain link, and the first chain link which firstly engages with another sprocket is called engaged chain link while the chainlink located between the escaping chain link and the engaged chain link are called transition chain link. The feature of the present invention lies in: it sets up three characteristic teeth at both the large sprocket and the small sprocket respectively where there is a side recess at each of the three feature teeth of the large sprocket at the surface facing the small sprocket, while there is also a side recess at each of the three feature teeth of the small sprocket at the surface facing the large sprocket. During the chain shifting, the side recesses set up at the feature teeth of the two sprockets can effectively avoid the occurrence of interference, also, as the chain is hauled by the rear derailleur device, the escaping chain link can sidetrack from the sprocket originally meshed toward another sprocket by means of the guidance of the side recesses to enable the transition chain links to be contained accordingly in the side recesses between the two sprockets, and through the guidance of the profiles of the side recesses, the engaged chain link engages accordingly with another sprocket, thereafter, drives the chain to sidetrack to engage with another sprocket to complete the chain shifting action smoothly and steadily without lifting up the chain.

One other objective of the present invention is to set up a circular top end recess at the top of the teeth profile at the first and second feature teeth to avoid interfering the chainhead part of the engaged chain link during the sidetracking of the chain. In addition, the circular top end recess possesses the effect of supporting the engaged chain link which make the chain shifting process more smoothly and reliable.

In order to illustrate clearly the relationship between the feature teeth and the motion path of chain shifting of the chain as well as the principle of the action, the authors herewith present several preferred embodiments with the accompanied drawings as shown in the followings:

DETAILED DESCRIPTION OF THE INVENTION

Figure 1:
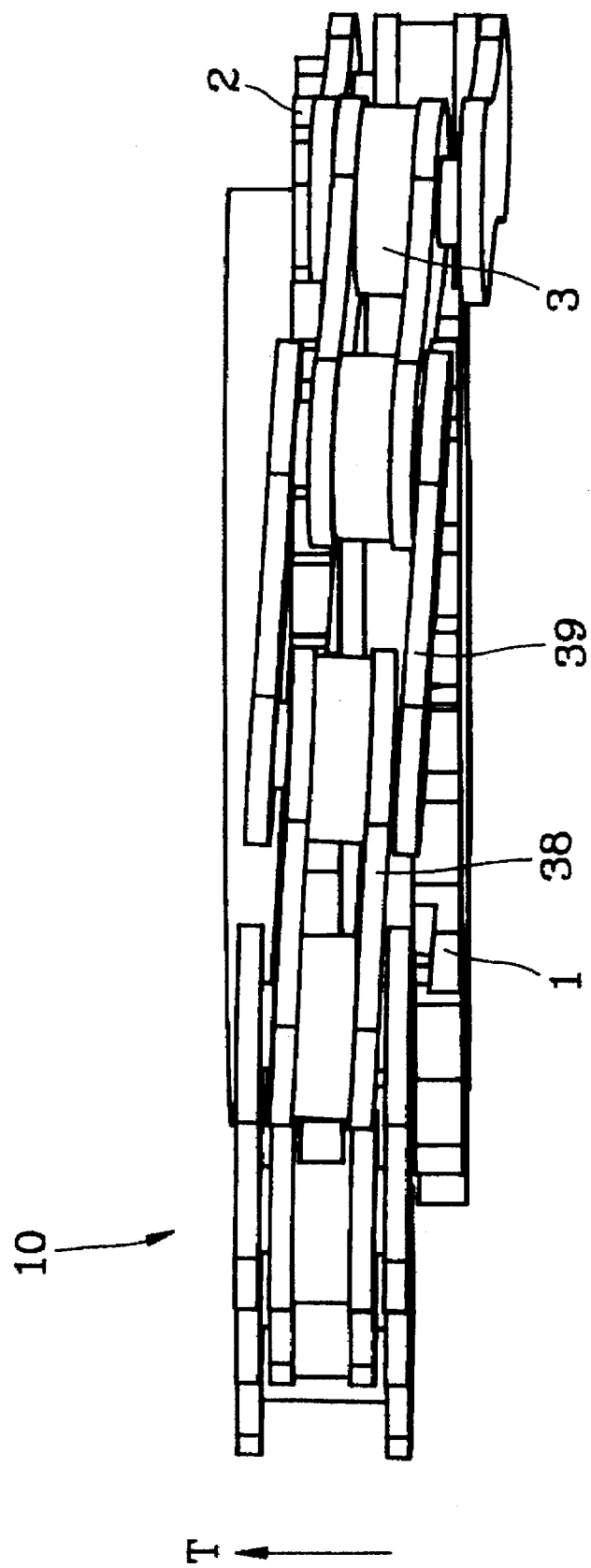
FIG. 1 is a top view of the schematic motion diagram of the chain during the chain shifting of the present invention.
Figure 2:
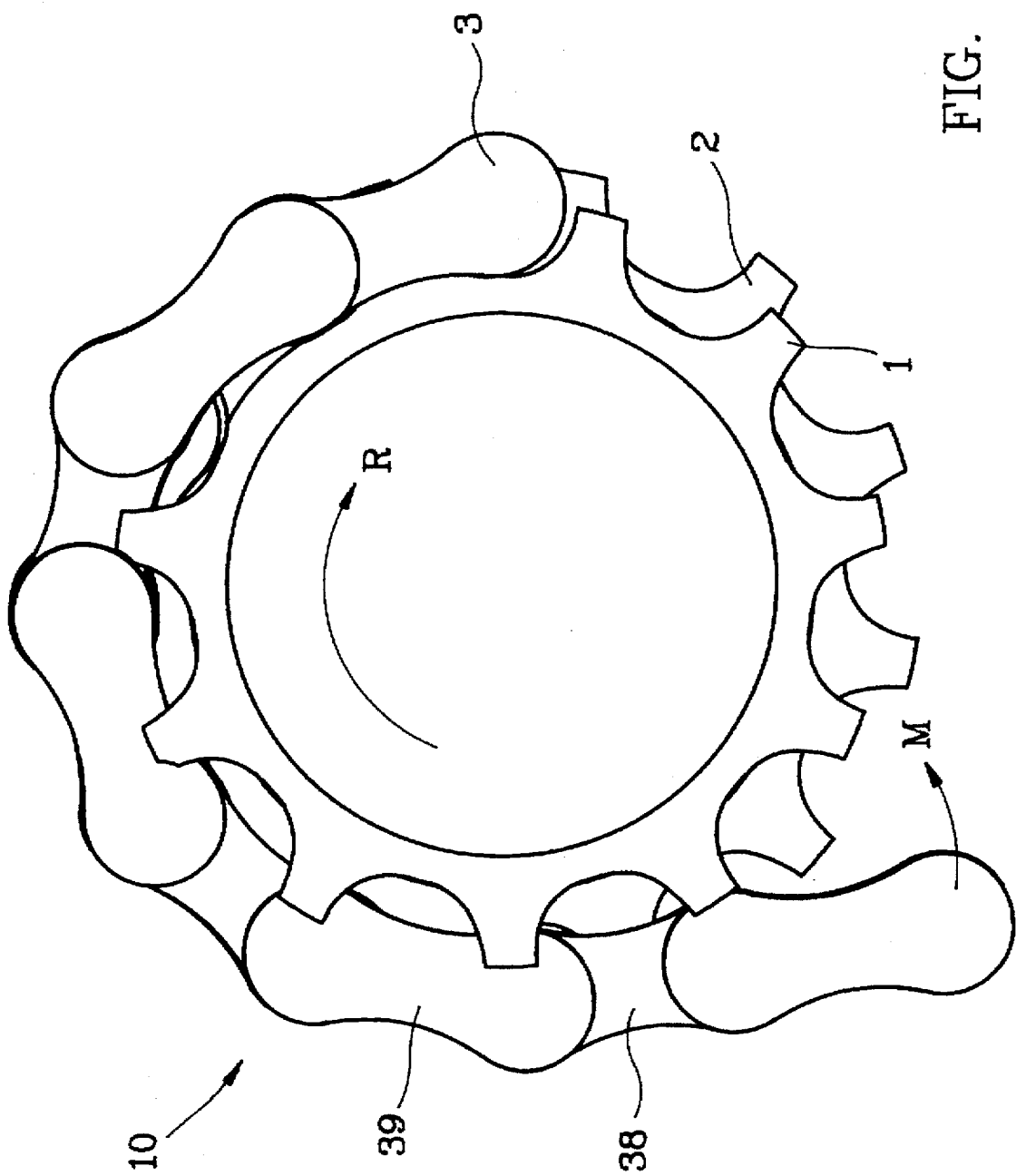
FIG. 2 is a front view of the schematic motion diagram of the chain during the chain shifting of the present invention.

As shown in FIG. 1 and FIG. 2, which illustrate a schematic motion diagram of the chain during the chain shifting of the multi-speed sprocket assembly 10 of a bicycle of the present invention. The multi-speed sprocket assembly 10 comprises at least a small sprocket 1 and a large sprocket 2, together with a chain 3 which consists of an inner and an outer chain link 38,39. The multi-speed sprocket assembly 10 driven by meshing with the chain 3 carries out clockwise rotation as shown in the R-direction of FIG. 2. As shown in M-direction of FIG. 2, the meshing action of the chain to the sprockets 1,2 are from the top to the bottom of the sprockets. In addition, the chain 3, hauled by the rear derailleur device, can be sidetracked to mesh with a different sprocket as shown in the T-direction of FIG. 1 to attain the chain shifting effect.

Figure 3:
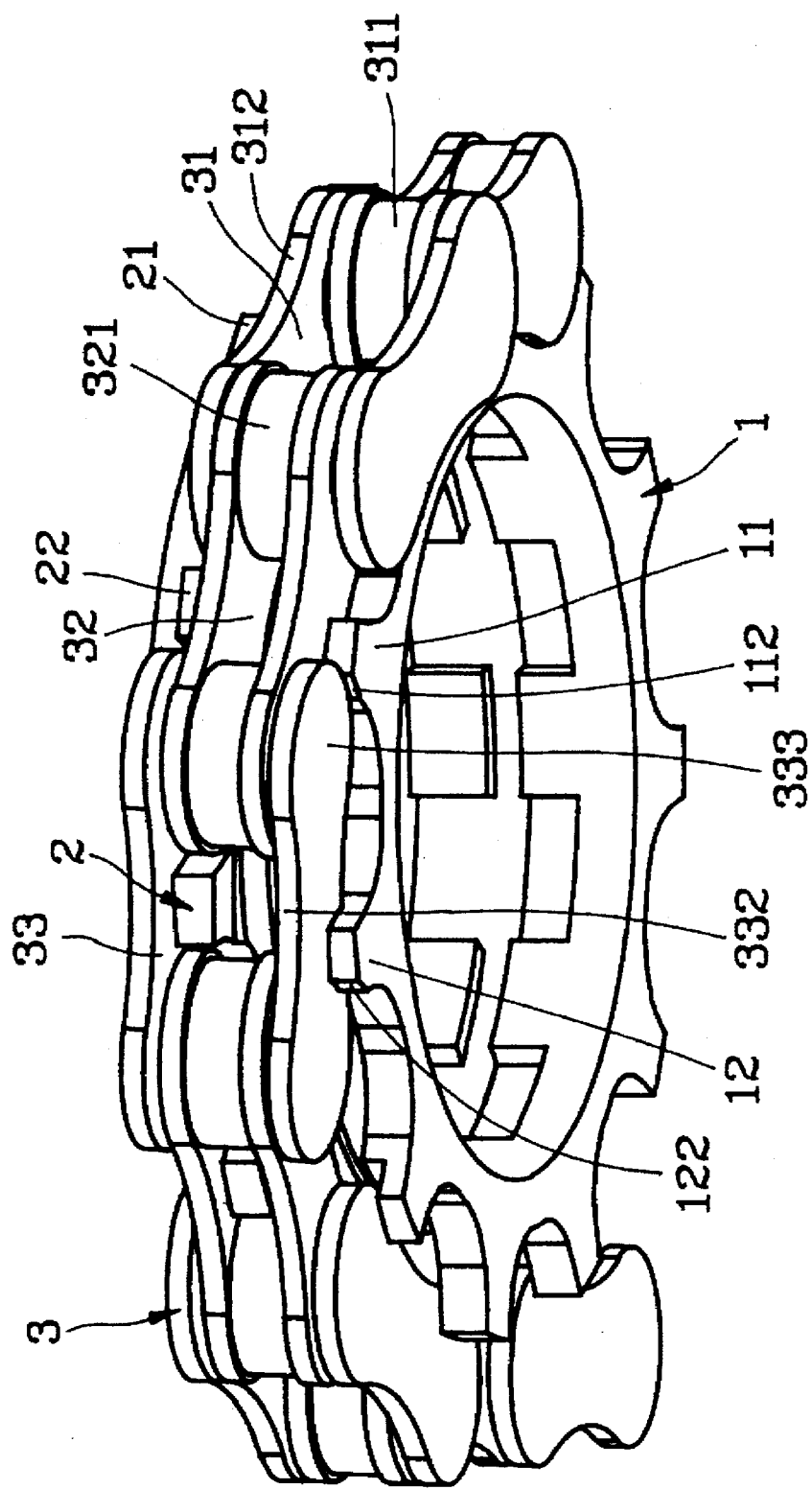
FIG. 3 is an isometric view of the embodiment of a first kind gear shifting motion path of the present invention.
Figure 4:
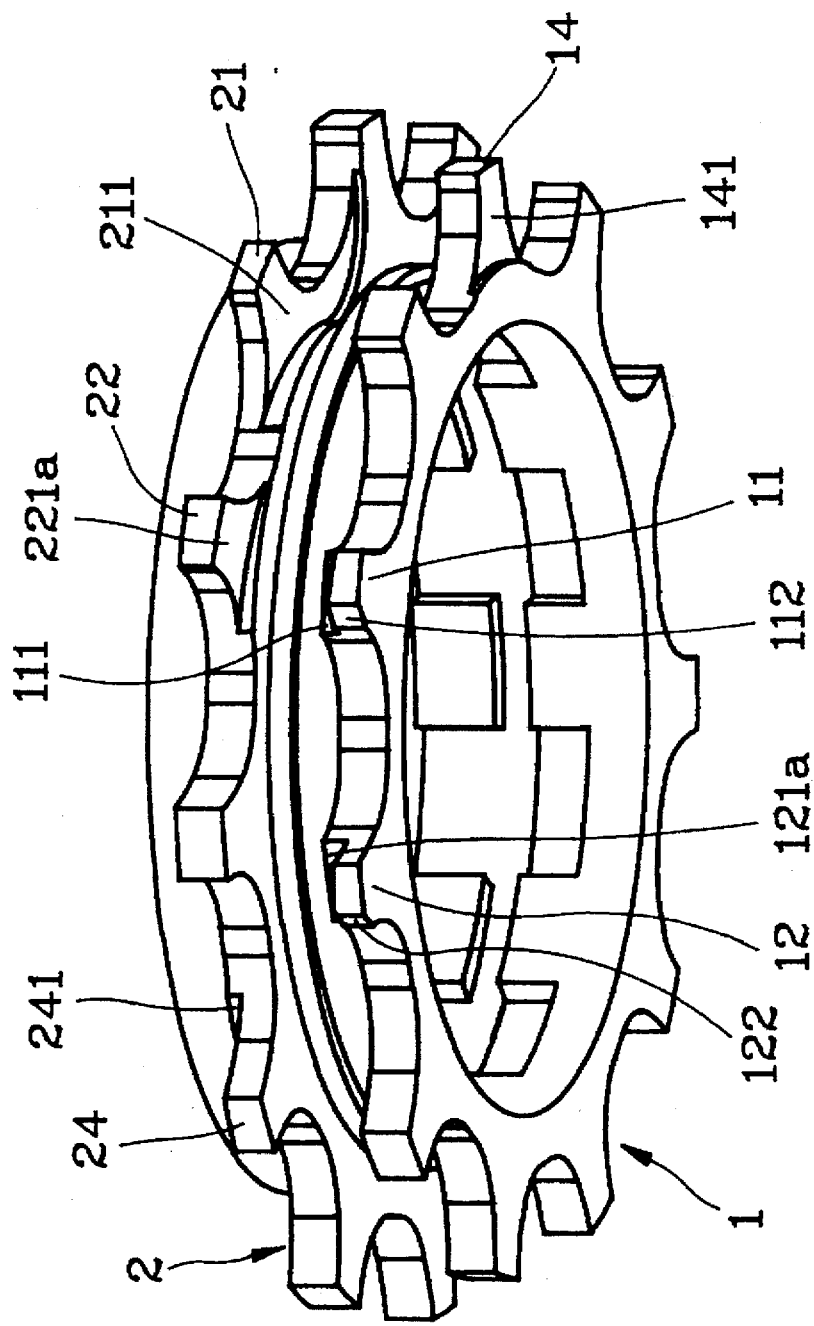
FIG. 4 is an isometric view of the embodiment of the multi-speed sprocket assembly in coordination with the first kind chain shifting motion path of the present invention (not including the chain).

As shown in FIGS. 3 and 4, where FIG. 4 is the multi-speed sprocket assembly like FIG. 3 but without a chain, they are the isometric views of the embodiment of the first kind chain shifting motion path of the multi-speed sprocket assembly 10 of the present invention. During the course when the chain 3 hauled by the the rear derailleur device (not shown in the Figures) intends to shift gear meshing from the small sprocket 1 to the sprocket 2, the last chain link escaped from the sprocket 1 is called escaping chain link 31 while the first chain link meshed with the sprocket 2 is called engaged chain link 33, also the chain links between the escaping chain link 31 and the engaged chain link 33 are called transition chain links 32.

When the difference of gear number of sprocket 1 and 2 is relatively small (say one or two teeth in difference), the chain 3 will be very easy to interfere with the sprocket 1 and 2 during the sidetracking and chain shifting process. To avoid the interference, a first feature teeth 21 and a second feature teeth 22 are set up at the large sprocket 2 of the present invention, while a fourth feature teeth 11 and a fifth feature teeth 12 are set up at the small sprocket 1. Also, side recesses 211, 221a are respectively set up at the first and second feature teeth 21, 22 of the large sprocket 2 on a surface facing the small sprocket 1 while side recesses 111, 121a are respectively set up at the fourth and fifth feature teeth 11, 12 of the small sprocket 1 on the surface facing the large sprocket 2.

During the chain shifting, these side recesses 111,121a, 211,221a can effectly avoid the occurrence of interferance. As the chain 3 is hauled by the rear derailleur device (not shown in the Figures), its escaping chain link 31 can touch on the side recess 211 in order to guide the chain 3 to sidetrack from small sprocket 1 to large sprocket 2 because of the special profile of the side recess 211, while the transition chain link 32 drops within and is contained accordingly between the side recesses 221a,111 of the second and forth feature teeth 22 and 11, thereby, the transition chain link 32 is positioned naturally between the two sprockets 1,2 (note: chain 3 is not propped up intentionally). Also, by means of a guiding track substantially formed by the coordinated profiles of the side recess 111 and 221a, it can guide the following engaged chain link 33 to be received by the side recess 121a formed at the fifth feature teeth 12; it further makes use of the profile of the side recess 121a to guide the engaged chain link 33 to mesh accordingly to the large sprocket 2, thereafter, to drive the chain 3 to sidetrack to mesh with the large sprocket 2 to attain the object of chain shifting action smoothly and steadily without lifting up the chain 3.

In order to smoothly carry out the chain shifting action in accordance with the motion path and planning as mentioned above, side recesses 111,121a are set up at the feature teeth 11,12 of small sprocket 1, so are the side recess 211,221a set up at the feature teeth 21,22 of large sprocket 2. As shown in FIG. 4, the side recess 211 at the first feature teeth 21 of the sprocket 2 is to contain the sidetracked chain plate 312 of the escaping chain link 31, in addition, since the profile of the side recess 211 is similar to that of the chain plate 312 and since the recessed thickness at the starting end (right-hand end) of the side recess 211 is slightly smaller than that of the ending end (left-hand end), it forms a substantially inclined plane to guide the transition chain link 32 to sidetrack from sprocket 1 to the middle of sprocket 1 and sprocket 2. At this moment, the transition chain link 32 is an inner chain link, and the profile of the side recess 221a and that of the side recess 111 can exactly enable the transition chain link 32 to smoothly drop in between them. Further, the depths of both the side recess 221a and 111 can exactly enable the transition chain link 32 to sustain almost at the same height as that of the chain 3 under the normal motion state without being propped up intentionally. In addition, since the recessed thickness at the starting end (right-hand end) of the side recess 221 is slightly smaller than that of the ending end (left-hand end), and since the recessed thickness at the starting end (right-hand end) of the side recess 111 is slightly bigger than that of the ending end (left-hand end), they form inclined planes to guide the transition chain link 33 to sidetrack from the middle of sprocket 1 and sprocket 2 toward the large sprocket 2.

In addition, the side recess 121a at the fifth feature teeth 12 of the small sprocket 1 can exactly receive and support the chain plate 332 of the engaged chain link 33. Since the recessed thickness at the starting end (right-hand end) of the side recess 121a is slightly bigger than that of the ending end (left-hand end), it forms an inclined plane to guide the engaged chain link 33 to mesh with sprocket 2. In the meantime, the recessed depth of the side recess 121a can appropriately support the chain plate 332 to enable the engaged chain link 33 to sustain its height almost the same as that of the large sprocket 2 and is not propped up intentionally. The engaged chain link 33 is the first chain link to engage with the sprocket 2 and the subsequent chain links can mesh with the large plate 2 sequentially. Thereby, it can smoothly and steadily complete the chain shifting action without lifting up the chain 3 intentionally. In addition, a top end recess 112 can be set up at the top of the fourth feature teeth to receive and contain the chainhead end 333 of the engaged chain link 33 to perform a supporting action to reinforce the steadiness of the chain 3 during the chain shifting process.

It is noted that following illustrated embodiments have in general similar structure like the one described previously. Therefore same numerals are used for similar type of elements.

As shown in FIG. 1, since chain 3 is consisted of an inner and an outer chain links alternate each other, the embodiment of first kind chain shifting path in the actual application as shown in FIG. 3 can only satisfy on of the above mentioned case, while the other case needs the chain shifting path of the chain of the second kind. The only difference between the two is the interchange of the outer and inner chain links 38,39.

Figure 5:
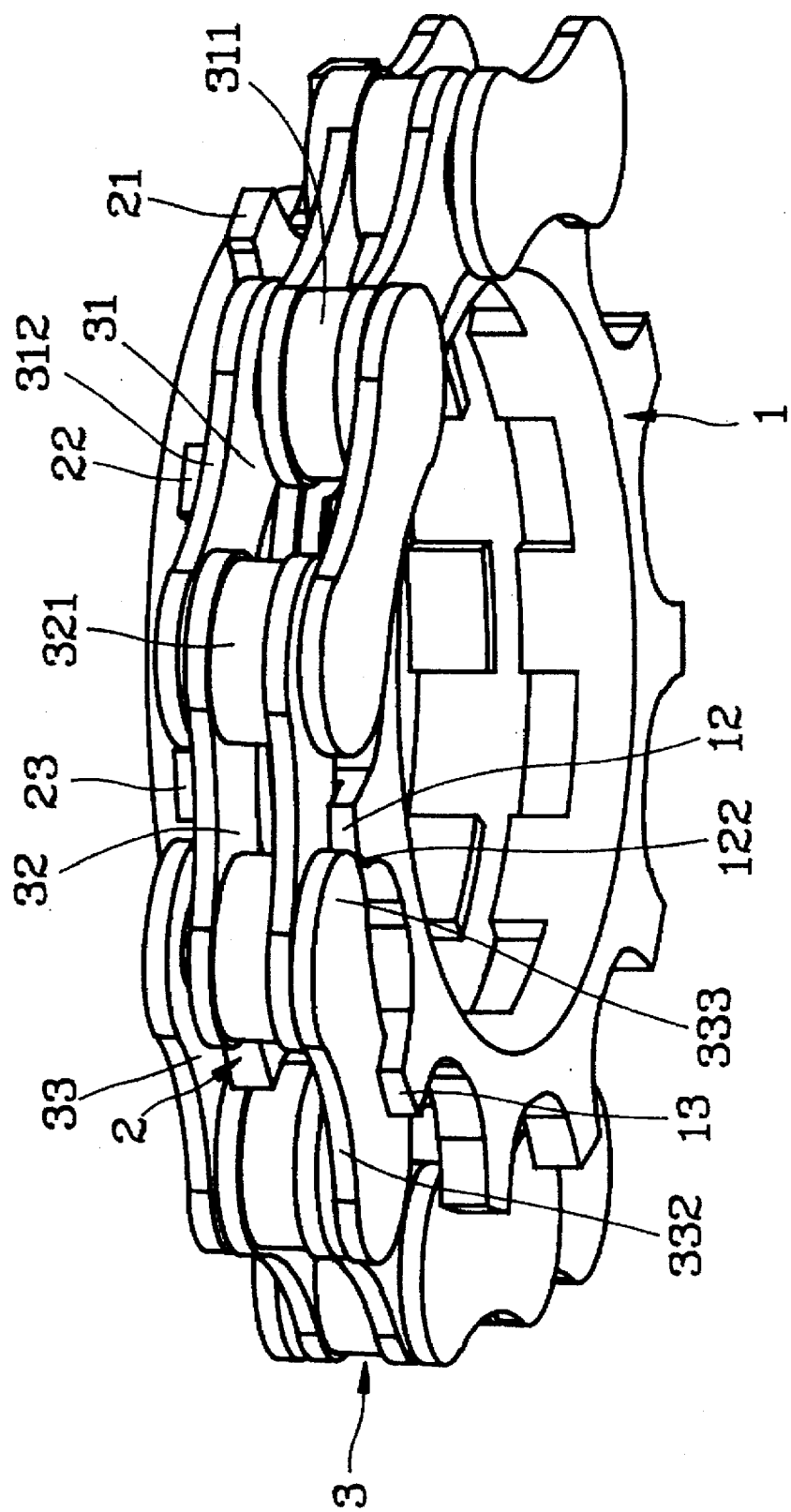
FIG. 5 is an isometric view of the embodiment of a second kind chain shifting motion path of the present invention.
Figure 6:
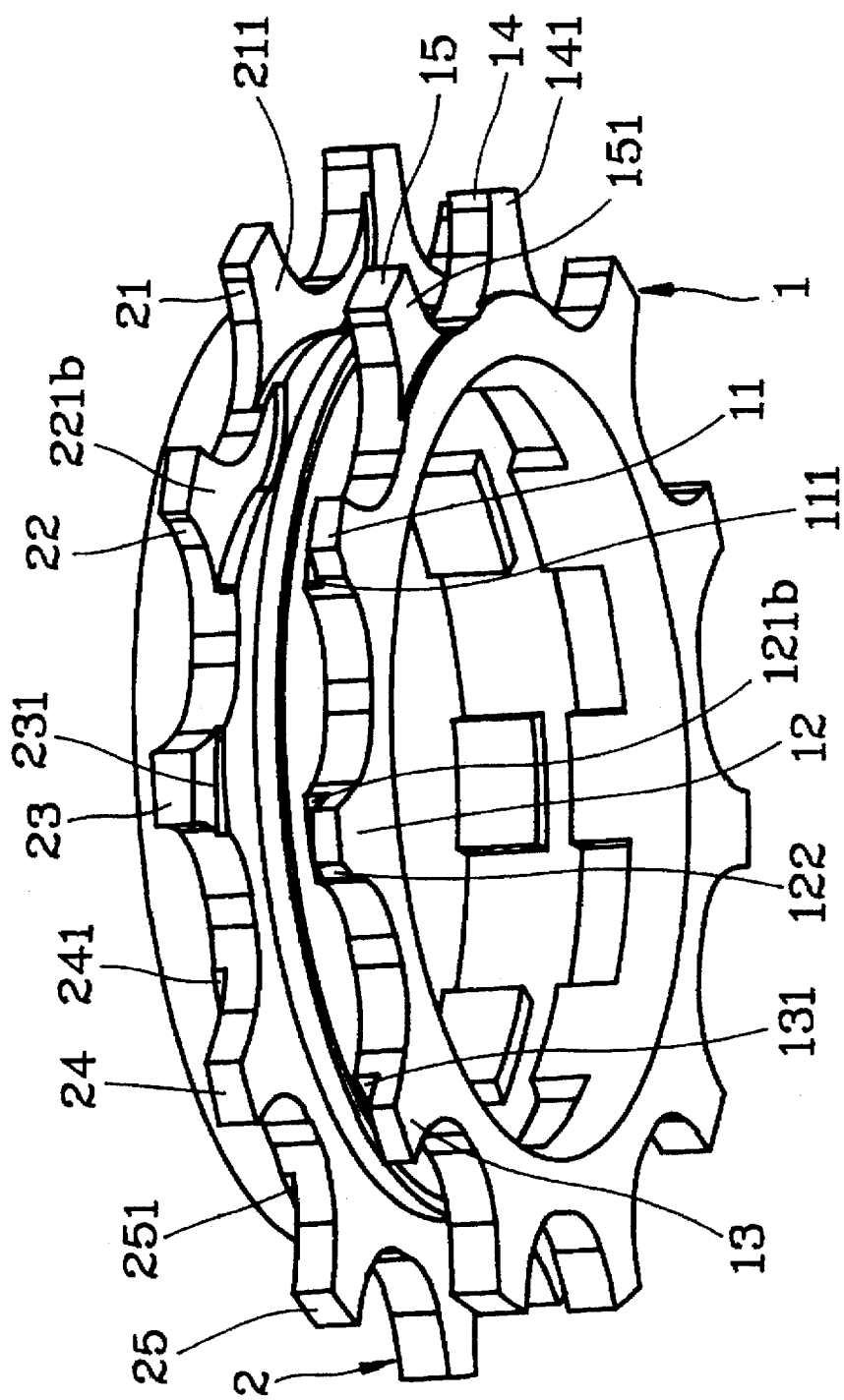
FIG. 6 is an isometric view of the embodiment of the multi-speed sprocket assembly in coordination with the second kind chain shifting motion path of the present invention (not including the chain).

As shown in FIG. 5 and FIG. 6, it is the embodiment of the second kind chain shifting path where FIG. 6 is the same as FIG. 5 but without the chain. To compare with the first kind chain shifting path of the chain as shown in FIG. 3, the main difference is that the escaping roller 311 of the escaping chain link 31 shifts a tooth distance toward the left-hand side which result in the corresponding shifting of the side recess application also a tooth distance toward the left-hand side.

As shown in FIG. 6, it is the arrangement of the feature teeth at the small sprockets 1 and large sprocket 2 in the light of the second kind chain shifting path of the chain where the side recess 221b at the second feature teeth 22 of the sprocket 2 is to contain the sidetracked chain plate 312 of the escaping chain link 31. Also, the side recess 121b of the fifth feature teeth 12 of the small sprocket 1 and the side recess 231 of the third feature teeth 23 of the large sprocket 2 are to enable the transition chain link 32 to smoothly drop in between them. Besides, a top end recess 122 and a side recess 131 set up at the fifth feature teeth 12 and sixth feature teeth 13 respectively of the small sprocket 1 are to receive and contain the chainhead end 333 and chain plate 332 of the engaged chain link 33. As for this embodiment, the various feature teeth and the design principles and efficacies mentioned in the second kind chain shifting path are basically the same as the previous embodiment of the first kind chain shifting path. The only difference is that the escaping roller 311 of the escaping chain link 31 shifts a tooth distance toward the left-hand side, therefore, it is not necessary to go into details.

Figure 7:
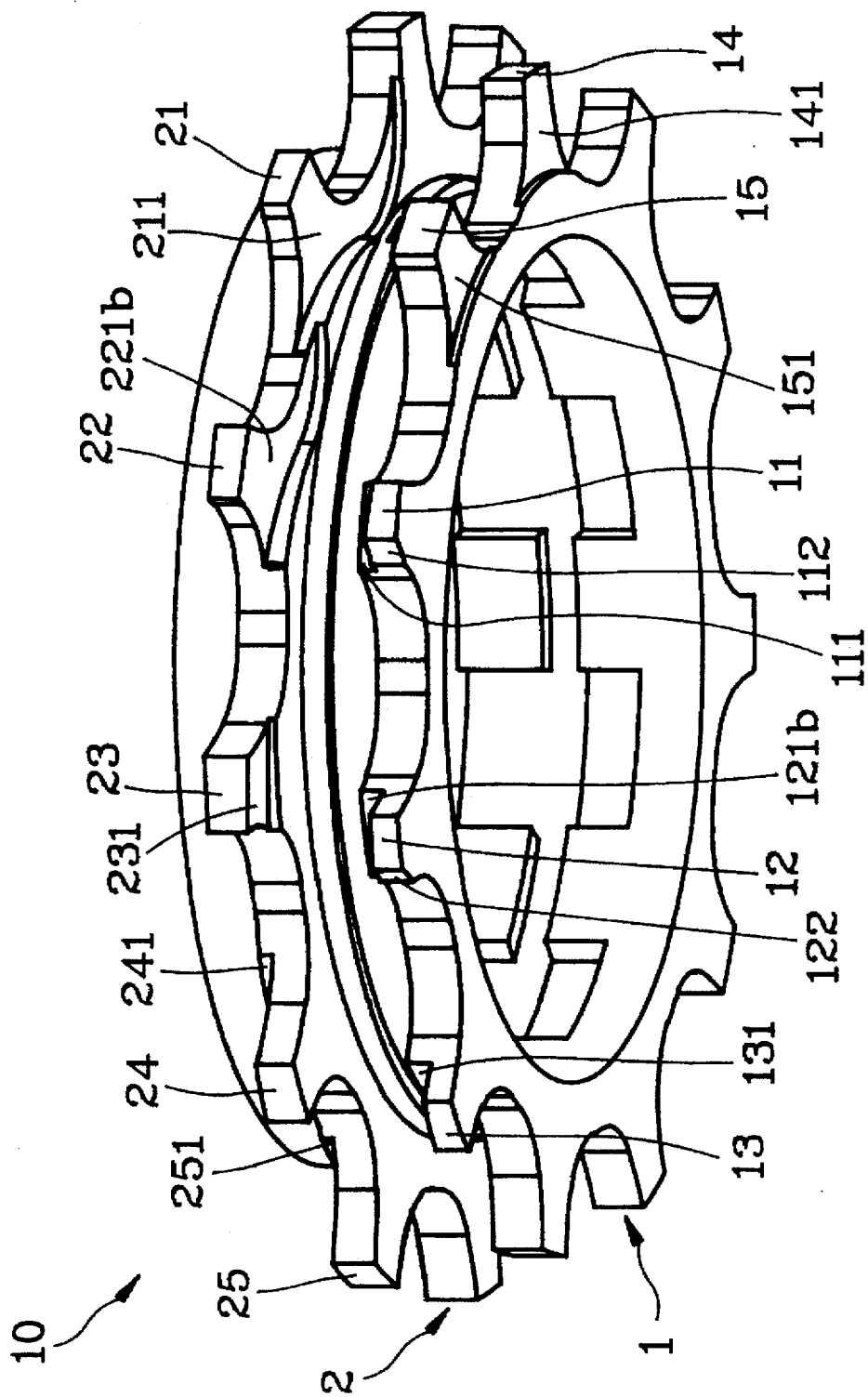
FIG. 7 is an isometric view of the embodiment of the multi-peed sprocket assembly integrating both two kinds of the chain shifting motion pathes of the present invention.

As shown in FIG. 7, in order that the multi-speed sprocket assembly 10 of the present invention can support both the above-mentioned embodiments in the same time such that no matter what kind of chain shifting path of the chain will be, it can always use the present invention to attain the object of completing the chain shifting action smoothly and steadily without the necessity of lifting up the chain 3 intentionally. The present invention is the application of feature teeth carried out by integrating two kinds of chain shifting paths of the chain into a multi-speed sprocket assembly. It is an embodiment to fabricate the sprockets shown in FIG. 4 and FIG. 6 together and sets up at the same sprocket to obtain a multi-speed sprocket assembly as shown in FIG. 7 where the large sprocket 2 possesses first feature teeth 21, second feature teeth 22, and third feature teeth 23 while the small sprocket 1 possesses fourth feature teeth 11, fifth feature teeth 12, and sixth feature teeth 13, and no matter what kind of chain shifting path of the chain will be, it can always use the embodiment of the multi-speed sprocket assembly 10 as shown in FIG. 7 to attain the object of completing the chain shifting action smoothly and steadily.

Figure 8:
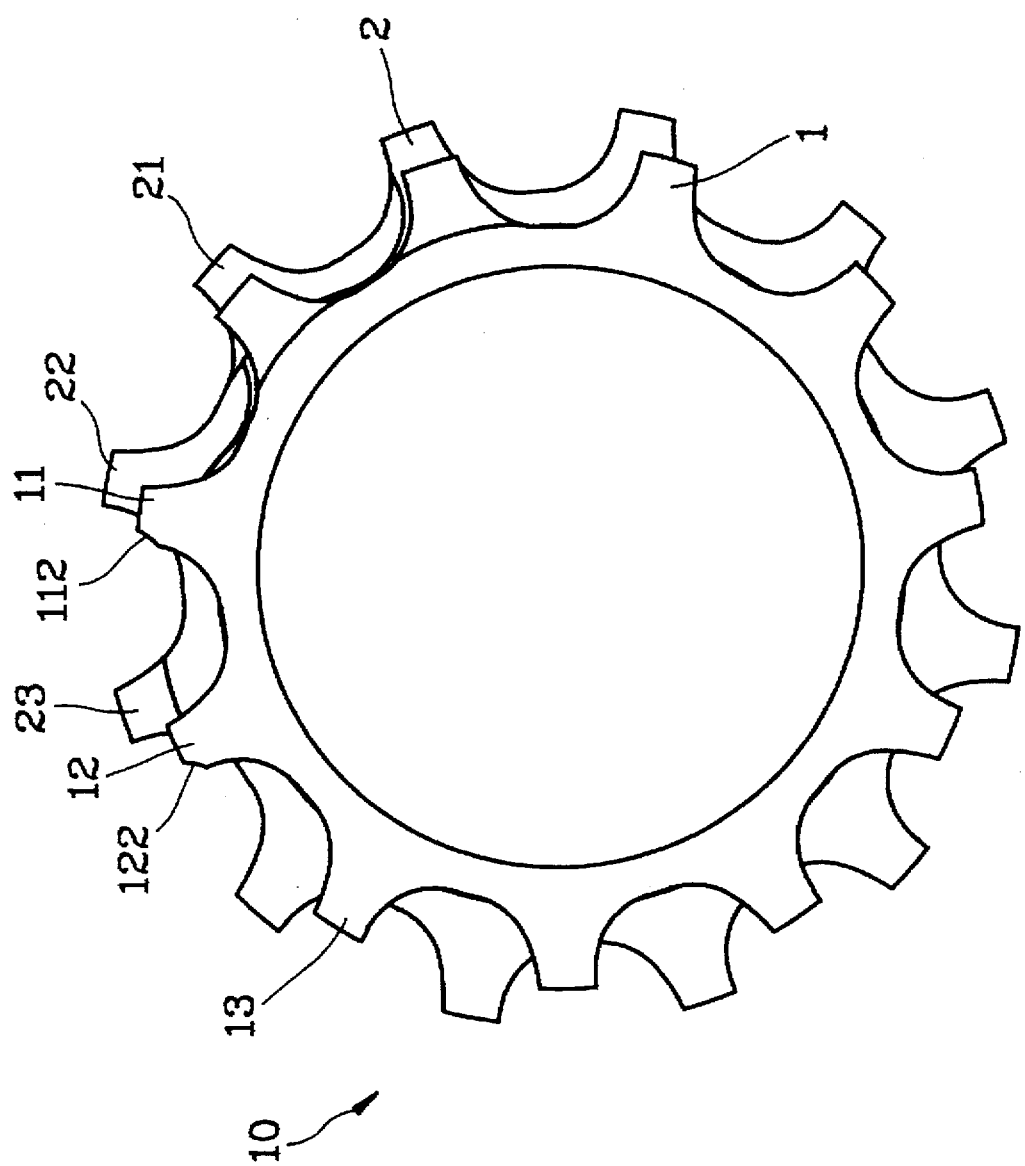
FIG. 8 is a front view of the multi-speed sprocket assembly of the present invention.

Of course, the above illustrated and described embodiments are only some of the preferred embodiments of the present invention and should not be used to limit the overall scope of the present invention. For instance: 1. In the light of the adjustment of the gap between the sprocket 1 and 2, exterior side recesses 241,251 are set up at the teeth 24, 25 of the large sprocket 2 to facilitate the inner chain link after the engaged chain link to easily mesh with the teeth 24, 25 of the large plate 2. Also, exterior side recesses 141, 151 are set up at the teeth 14, 15 of the large sprocket 1 to facilitate the chain to easily sidetrack toward the sprocket 2. 2. As shown in FIG. 8, the circular top end recess 112, 122 at the feature teeth 11, 12 of the small sprocket 1 can be replaced by a slant linear top end recess (not shown in the Figures), or to change the size of the circular arc according to the number of the sprocket, or even to cancel it.

To summarize the above-mentioned statements, the present invention gives consideration to the fact that the chain is consisted of both the inner and outer chain links alternate each other during the course of the chain shifting. In the light of the very small difference of the number of teeth between the two sprockets of the multi-speed sprocket assembly of the present invention, it provides three feature teeth at both the large sprocket and the small sprocket respectively where there is a side recesses furnished at each of the three feature teeth of the large sprocket on the surface facing the small sprocket, while there is also a side recess furnished at each of the three feature teeth of the small sprocket on the surface facing the large sprocket. Furthermore, there is also a circular top end recess extended from the top of the teeth on the sides subjected to forces at the fourth and fifth feature teeth of the small sprocket. By the use of the feature teeth and their profiles of recesses to guide the engaged chain links to mesh with the other sprocket accordingly, thereafter, to drive the chain to sidetrack to the other sprocket such that the chain is "guided" by the profile of the recesses to move during the chain shifting of the chain in order to attain the object of completing the chain shifting motion smoothly and steadily without lifting up the chain. Thereby, it can effectively improve the disadvantages of unsteady chain shifting and low strength in teeth of the prior art.

Although certain specific embodiment of the present invention has been shown and described above, it is to be understood that many modification thereof are possible. The present invention, therefore, is not to be restricted except insofar as is necessitated by the prior art and by the spirit of the appended claims.

What is claimed is:

1. A multi-speed sprocket assembly of a bicycle comprising at least a large sprocket and a small sprocket; during a chain shifting process, the chain hauled by a rear derailleur device carries out chain shifting from a sprocket originaly meshed to another sprocket wherein the last chain link escaped from the sprocket originaly meshed is called the escaping chain link while the first chain link to mesh with the other sprocket is called the engaged chain link, as for the chain link between the escaping chain link and the engaged chain link is called transition chain link, the improvement of said multi-speed sprocket assembly comprising:

both said large sprocket and small sprocket being furnished with at least two feature teeth wherein each of said feature teeth of the large sprocket has a side recess formed at a side surface facing said small sprocket while each of the feature teeth of the small sprocket has a side recess at the side surface facing the large sprocket; said side recesses of the feature teeth of the small sprocket being cooperated with said side recesses of the feature teeth of the large sprocket in such a manner that a substantially guiding track is formed between said cooperated recesses of both the large and small sprockets for guiding a shifting direction of said chain during said chain shifting process;

during the chain shifting, the side recesses of the feature teeth of the two sprockets effectly avoid the occurence of interference, and when the chain is hauled by the rear derailleur device, the escaping chain link can sidetrack from the sprocket originally meshed toward the the other sprocket to facilitate the transition chain links to be contained accordingly in the side recesses between the two sprockets, and by means of the guidance of the guiding track formed between the side recesses, the engaged chain links engages accordingly with the other sprocket, thereafter, drives the chain motion to sidetrack to engage with the other sprocket, in this way, the chain is effectively guided by the guiding track to attain the object of completing the chain shifting action smoothly and steadily without lifting up the chain.

2. The multi-speed sprocket assembly of a bicycle as claimed in claim 1 wherein the chain shifting action between the two sprockets is from the small sprocket toward the large sprocket.

3. The multi-speed sprocket assembly of a bicycle as claimed in claim 1 wherein the large sprocket has one tooth more than that of the small sprocket.

4. The multi-speed sprocket assembly of a bicycle as claimed in claim 1 wherein the number of feature teeth set up at both the large sprocket and the small sprocket is three.

5. The multi-speed sprocket assembly of a bicycle as claimed in claim 1 wherein said feature teeth of the large sprocket comprises: a first feature teeth, a second feature teeth, and a third feature teeth, while said feature teeth of the small sprocket comprises: a fourth feature teeth, a fifth feature teeth, and a sixth feature teeth; when the chain is hauled by the rear derailleur device to carry out chain shifting from the small sprocket to the large sprocket, the escaping chain link is lifted to touch the side recess of the first feature teeth such that the profile of said recess of the first feature teeth guides the chain to sidetrack from the small sprocket to the large sprocket to facilitate the transition chain links to drop accordingly in the side recesses set up between the second feature teeth and the fourth feature teeth without being lifting up intentionally; in the meantime, by means of the guiding track formed by the side recesses at the second feature teeth and the fourth feature teeth, it can guide the engaged chain link to touch the side recess of the fifth feature teeth; in the same time to guide the engaged chain link to engage accordingly to the large sprocket, thereafter, to drive the chain to sidetrack to the large sprocket to complete the chain shifting action smoothly and steadily without the necessity of lifting up the chain.

6. The multi-speed sprocket assembly of a bicycle as claimed in claim 5 wherein the sidetracking direction of the chain during the chain shifting is guided by the guiding track formed by the side recesses at the feature teeth.

7. The multi-speed sprocket assembly of a bicycle as claimed in claim 5 wherein the latter two teeth, judging from the direction of the sprocket rotation, of the third feature teeth of the large sprocket can each set up an exterior side recess to facilitate the following chain links after the engaged chain link to mesh with the teeth of the large sprocket.

8. The multi-speed sprocket assembly of a bicycle as claimed in claim 5 wherein the former two teeth, judging from the direction of the sprocket rotation, of the forth feature teeth of the small sprocket can each set up an exterior side recess to facilitate the chain to sidetrack toward the large sprocket.

9. The multi-speed sprocket assembly of a bicycle as claimed in claim 5 wherein the fourth feature teeth and the fifth feature teeth of the small sprocket can each set up a top end recess which can touch the engaged chain link to reinforce the steadiness of the chain during the chain shifting.

10. The multi-speed sprocket assembly of a bicycle as claimed in claim 9 wherein the top end recess is circular in profile.

11. The multi-speed sprocket assembly of a bicycle as claimed in claim 9 wherein the profile of the top end recess is a slant linear one.

* * * * *